(12) United States Patent
Kim et al.

(10) Patent No.: US 11,887,282 B2
(45) Date of Patent: *Jan. 30, 2024

(54) NOISE REMOVING CIRCUIT, IMAGE SENSING DEVICE AND OPERATION METHOD OF THE SAME

(71) Applicant: SK hynix Inc., Gyeonggi-do (KR)

(72) Inventors: Dong Ik Kim, Gyeonggi-do (KR); Jin Su Kim, Gyeonggi-do (KR); Chang Ki Min, Gyeonggi-do (KR); Seong Hee Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,663

(22) Filed: Mar. 30, 2023

(65) Prior Publication Data

US 2023/0237624 A1 Jul. 27, 2023

Related U.S. Application Data

(63) Continuation of application No. 17/151,407, filed on Jan. 18, 2021, now Pat. No. 11,651,476.

(30) Foreign Application Priority Data

Jul. 17, 2020 (KR) .................. 10-2020-0088940

(51) Int. Cl.
*G06T 5/00* (2006.01)
*G06T 5/50* (2006.01)
(Continued)

(52) U.S. Cl.
CPC .............. *G06T 5/002* (2013.01); *G06T 5/009* (2013.01); *G06T 5/20* (2013.01); *G06T 5/50* (2013.01);
(Continued)

(58) Field of Classification Search
CPC ...... H04N 5/265; H04N 23/741; H04N 23/81; H04N 23/73; H04N 25/58; H04N 25/62;
(Continued)

(56) References Cited

U.S. PATENT DOCUMENTS 11,651,476 B2 * 5/2023 Kim ..................... G06T 5/009
                                                           348/241
2004/0218830 A1 11/2004 Kang et al.
(Continued)

FOREIGN PATENT DOCUMENTS

CN          103002225 A    3/2013
CN          110062160 A    7/2019
(Continued)

OTHER PUBLICATIONS

Office Action for the Chinese Patent Application No. 202110188792.X issued by the Chinese Patent Office dated Jun. 6, 2023.

*Primary Examiner* — Kelly L Jerabek
(74) *Attorney, Agent, or Firm* — IP & T GROUP LLP (57) ABSTRACT

A noise removing circuit includes an image combiner suitable for generating a high dynamic range (HDR) image by combining images having different exposure times; a detailed image generator suitable for generating a detailed image from the HDR image; an image strength evaluator suitable for evaluating strength of the detailed image; and a noise coring component suitable for performing a noise coring operation for removing noise from a region of the detailed image in which a signal to noise ratio (SNR) has (Continued)

decreased using a low threshold and a saturation threshold when the strength of the detailed image is less than a reference value.

14 Claims, 7 Drawing Sheets

(51) Int. Cl.
*G06T 5/20* (2006.01)
*H04N 5/265* (2006.01)
*H04N 23/741* (2023.01)

(52) U.S. Cl.
CPC ........... *H04N 5/265* (2013.01); *H04N 23/741* (2023.01); *G06T 2207/20208* (2013.01); *G06T 2207/30168* (2013.01)

(58) Field of Classification Search
CPC ........ H04N 25/60; H04N 25/57; H04N 25/70; G06T 5/002; G06T 5/009; G06T 5/20; G06T 5/50; G06T 7/13; G06T 2207/20208; G06T 2207/30168; G06T 2207/10016; G06T 2207/10144
See application file for complete search history.

(56) References Cited

U.S. PATENT DOCUMENTS

| | | | |
|---|---|---|---|
| 2005/0280868 A1* | 12/2005 | Kamon | H04N 1/4074 358/3.01 |
| 2006/0158529 A1* | 7/2006 | Katagiri | H04N 23/76 348/E3.018 |
| 2011/0013064 A1 | 1/2011 | Lahav et al. | |
| 2011/0211732 A1 | 9/2011 | Rapaport | |
| 2011/0285737 A1* | 11/2011 | Lin | G09G 5/10 345/589 |
| 2012/0170843 A1* | 7/2012 | Lin | G06T 5/008 382/167 |
| 2015/0002689 A1 | 1/2015 | Weissman et al. | |
| 2016/0352995 A1 | 12/2016 | Min et al. | |

FOREIGN PATENT DOCUMENTS

| | | |
|---|---|---|
| CN | 111161162 A | 5/2020 |
| EP | 2881915 A1 | 6/2015 |
| EP | 3319013 A1 | 5/2018 |
| JP | 2008-104009 A | 5/2008 |
| WO | 2016/139260 A1 | 9/2016 |

* cited by examiner

L: LONG EXPOSURE IMAGE    M: MIDDLE EXPOSURE IMAGE    S: SHORT EXPOSURE IMAGE

FIG. 3

| X1 | X2 | X3 | X4 | X5 |
|----|----|----|----|----|
| X6 | X7 | X8 | X9 | X10 |
| X11 | X12 | X13 | X14 | X15 |
| X16 | X17 | X18 | X19 | X20 |
| X21 | X22 | X23 | X24 | X25 |

5x5 Kernel

NOISE REMOVING CIRCUIT, IMAGE SENSING DEVICE AND OPERATION METHOD OF THE SAME

CROSS-REFERENCE TO RELATED APPLICATION

This patent application is a continuation of U.S. patent application Ser. No. 17/151,407 filed on Jan. 18, 2021, which claims priority under 35 U.S.C. § 119 on Korean Patent Application No. 10-2020-0088940, filed on Jul. 17, 2020, which are herein incorporated by reference in their entirety.

TECHNICAL FIELD

Various embodiments of the present invention generally relate to a semiconductor device. Particularly, various embodiments relate to a noise removing circuit, an image sensing device and an operation method of the same.

BACKGROUND

Recently, the computer environment paradigm has shifted to ubiquitous computing, which enables a computer system to be used virtually anytime and everywhere. As a result, use of portable electronic devices such as mobile phones, digital cameras, notebook computers and the like has been rapidly increasing.

Recently, due to the rapid development of display devices, the development of image photographing devices having image sensors, such as cameras and camcorders, has accelerated. An image photographing device can photograph an image and record the photographed image in a recording medium, and also reproduce the image at any time. Accordingly, as use of image photographing devices has increased, the demand for more functionality in the image photographing device has also increased. Specifically, in addition to compact size, reduced weight, and lower power consumption, an image photographing device with higher capability functionality as well as multi-functions is desirable.

SUMMARY

Embodiments of the present invention are directed to a noise removing circuit, an image sensing device and an operation method of the same, capable of improving a signal-to-noise ratio (SNR) of an SNR dip occurrence region in high dynamic range (HDR) image combination by performing a noise coring on an image of the SNR dip occurrence region using a low threshold parameter and a saturation threshold parameter when images having different exposure time are combined as a single HDR image.

In an embodiment, a noise removing circuit may include an image combiner suitable for generating a high dynamic range (HDR) image by combining images having different exposure times; a detailed image generator suitable for generating a detailed image from the HDR image; an image strength evaluator suitable for evaluating strength of the detailed image; and a noise coring component suitable for performing a noise coring operation for removing noise from a region of the detailed image in which a signal to noise ratio (SNR) has decreased using a low threshold and a saturation threshold when the strength of the detailed image is less than a reference value.

The detailed image generator may include a first conversion block suitable for converting the HDR image to a log domain signal representing a first converted image; a low pass filter suitable for performing low pass filtering on the HDR image to generate a low-pass-filtered image; a second conversion block suitable for converting the low-pass-filtered image to a log domain signal representing a second converted image; and a calculation block suitable for generating the detailed image by calculating a difference value between the first converted image and the second converted image.

The images having different exposure times may include a long exposure image, a middle exposure image and a short exposure image, wherein the low threshold indicates a first region in which the long exposure image and the middle exposure image overlap, and wherein the saturation threshold indicates a second region in which the middle exposure image and the short exposure image overlap.

The strength of the detailed image may represent variance of pixel values of the detailed image represented by a pixel array having a set size, the strength of the detailed image may be large when the variance of the detailed image is greater than a reference value, and the strength of the detailed image may be small when the variance of the detailed image is less than the reference value.

The noise coring component may adjust a noise coring strength using a coring width parameter in the first region and the second region.

The noise coring strength may be expressed according to the following equation:

$$\text{coring strength}_{low} = (\text{Log}(Y) - \text{Log}(\text{Lowth})) / (\text{Log}(\text{Lowth} + \text{coring\_width}) - \text{Log}(\text{Lowth}))$$

$$\text{coring strength}_{sat} = (\text{Log}(Y) - \text{Log}(\text{Satth})) / (\text{Log}(\text{Satth} + \text{coring\_width}) - \text{Log}(\text{Satth})),$$

where 'coring strength$_{low}$' represents the coring strength of the first region, 'coring strength$_{sat}$' represents the coring strength of the second region, 'Log' represents a log domain conversion function, 'Lowth' represents the low threshold, 'Satth' represents the saturation threshold and 'coring_width' represents the coring width parameter.

The noise coring component may acquire the noise coring parameter using the noise coring strength and an inclination coefficient.

In another embodiment, an image sensing device may include an image sensor including a pixel array having a plurality of pixels; an image signal processor suitable for processing an output signal of the image sensor; and a noise removing circuit including: an image combiner suitable for generating a high dynamic range (HDR) image by combining images having different exposure times; a detailed image generator suitable for generating a detailed image from the HDR image; an image strength evaluator suitable for evaluating strength of the detailed image; and a noise coring component suitable for performing a noise coring operation for removing a noise from a region of the detailed image in which a signal to noise ratio (SNR) has decreased using a low threshold and a saturation threshold when the strength of the detailed image is less than a reference value.

The detailed image generator may include a first conversion block suitable for converting the HDR image to a log domain signal representing a first converted image; a low pass filter suitable for performing low pass filtering on the HDR image to generate a low-pass-filtered image; a second conversion block suitable for converting the low-pass-filtered image to a log domain signal representing a second converted image; and a calculation block suitable for generating the detailed image by calculating a difference value between the first converted image and the second converted image.

The images having different exposure times may include a long exposure image, a middle exposure image and a short exposure image, the low threshold may indicate a first region in which the long exposure image and the middle exposure image overlap, and the saturation threshold may indicate a second region in which the middle exposure image and the short exposure image overlap.

The strength of the detailed image may represent variance of pixel values of the detailed image represented by a pixel array having a set size, wherein the strength of the detailed image is large when the variance of the detailed image is greater than a reference value, and wherein the strength of the detailed image is small when the variance of the detailed image is less than the reference value.

The noise coring component may adjust a noise coring strength using a coring width parameter in the first region and the second region.

The noise coring strength may be expressed according to the following equation:

$$\text{coring strength}_{low}=(\text{Log}(Y)-\text{Log}(\text{Lowth}))/(\text{Log}(\text{Lowth}+\text{coring\_width})-\text{Log}(\text{Lowth}))$$

$$\text{coring strength}_{sat}=(\text{Log}(Y)-\text{Log}(\text{Satth}))/(\text{Log}(\text{Satth}+\text{coring\_width})-\text{Log}(\text{Satth})),$$

where 'coring strength$_{low}$' represents the coring strength of the first region, 'coring strength$_{sat}$' represents the coring strength of the second region, 'Log' represents a log domain conversion function, 'Lowth' represents the low threshold, 'Satth' represents the saturation threshold and 'coring_width' represents the coring width parameter.

The noise coring component may acquire the noise coring parameter using the noise coring strength and an inclination coefficient.

In another embodiment, an operation method of an image sensing device may include generating a high dynamic range (HDR) image by combining a long exposure image, a middle exposure image and a short exposure image; generating a detailed image from the HDR image; evaluating strength of the detailed image; and performing a noise coring operation for removing noise from a region of the detailed image in which a signal to noise ratio (SNR) has decreased using a low threshold and a saturation threshold when the strength of the detailed image is less than a reference value, wherein the low threshold indicates a first region in which the long exposure image and the middle exposure image overlap, and the saturation threshold parameter indicates a second region in which the middle exposure image and the short exposure image overlap.

The generating of the detailed image may include converting the HDR image to a log domain signal representing a first converted image; performing low pass filtering on the HDR image; converting the low-pass-filtered image to a log domain signal representing a second converted image; and generating the detailed image by calculating a difference value between the first converted image and the second converted image.

The strength of the detailed image may represent variance of pixel values of the detailed image represented by a pixel array having a set size, wherein the strength of the detailed image is large when the variance of the detailed image is greater than a reference value, and wherein the strength of the detailed image is small when the variance of the detailed image is less than the reference value.

Performing the noise coring operation may include adjusting a noise coring strength using a coring width parameter in the first region and the second region.

The noise coring strength may be expressed according to the following equation:

$$\text{coring strength}_{low}=(\text{Log}(Y)-\text{Log}(\text{Lowth}))/(\text{Log}(\text{Lowth}+\text{coring\_width})-\text{Log}(\text{Lowth}))$$

$$\text{coring strength}_{sat}=(\text{Log}(Y)-\text{Log}(\text{Satth}))/(\text{Log}(\text{Satth}+\text{coring\_width})-\text{Log}(\text{Satth})),$$

where 'coring strength$_{low}$' represents the coring strength of the first region, 'coring strength$_{sat}$' represents the coring strength of the second region, 'Log' represents a log domain conversion function, 'Lowth' represents the low threshold, 'Satth' represents the saturation threshold and 'coring_width' represents the coring width parameter.

Performing the noise coring operation may further include acquiring the noise coring parameter using the noise coring strength and an inclination coefficient.

In another embodiment, a method of processing a high dynamic range (HDR) image, the method may include generating a detailed image from the HDR image; and removing noise from at least one region of the HDR image in which a signal-to-noise ratio (SNR) has decreased by using a noise coring parameter of the HDR image obtained according to following equations when strength of the detailed image is less than a reference value:

$$\text{coring } param = a_{coeff} * \text{Detail}(x) * (1 - \text{coring strength}),$$

$$\text{if } 0 \leq \text{coring strength} \leq 1,$$

$$\text{Detail}(x) = \begin{cases} 0, & \text{if } \text{Var}(\text{Kernel}_{5\times 5}) \geq \text{Threshold} \\ 1, & \text{if } \text{Var}(\text{Kernel}_{5\times 5}) < \text{Threshold} \end{cases}$$

$$\text{coring strength}_{low} =$$

$$(\text{Log}(Y) - \text{Log}(Lowth))/(\text{Log}(Lowth + \text{coring\_width}) - \text{Log}(Lowth)),$$

$$\text{coring strength}_{out} =$$

$$(\text{Log}(Y) - \text{Log}(Satth))/(\text{Log}(Satth + \text{coring\_width}) - \text{Log}(Satth)),$$

where 'coring param' represents the noise coring parameter; '$\alpha_{coeff}$' represents an inclination coefficient; 'Detail(x)' represents strength of the detailed image; 'Var(Kernel$_{5\times 5}$)' represents variance of the detailed image; 'coring strength$_{low}$' represents coring strength of a low threshold region of the HDR image, 'coring strength$_{sat}$' represents coring strength of a saturation threshold region of the HDR image, 'Log( )' represents a log domain conversion function, 'Lowth' represents a low threshold of the HDR image, 'Satth' represents a saturation threshold of the HDR image and 'coring_width' represents a coring width parameter.

These and other features and advantages of the present invention will become understood by those with ordinary skill in the art of the present invention from the following drawings and detailed description.

BRIEF DESCRIPTION OF THE DRAWINGS

The description herein makes reference to the accompanying drawings wherein like reference numerals refer to like parts throughout the several views.

DETAILED DESCRIPTION

Various examples of the present invention are described below in more detail with reference to the accompanying drawings. The invention may be realized in other embodiments, forms and variations thereof and thus should not be construed as being limited to the embodiments set forth herein. Rather, the described embodiments are provided so that this present invention is thorough and complete and fully conveys the present invention to those skilled in the art to which this invention pertains. Throughout the specification, reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance may be referred to as a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the present invention and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the present invention are described in detail with reference to the accompanied drawings.

Hereinafter, a noise removing circuit is described with reference to FIGS. 1 to 5.

Figure 1:
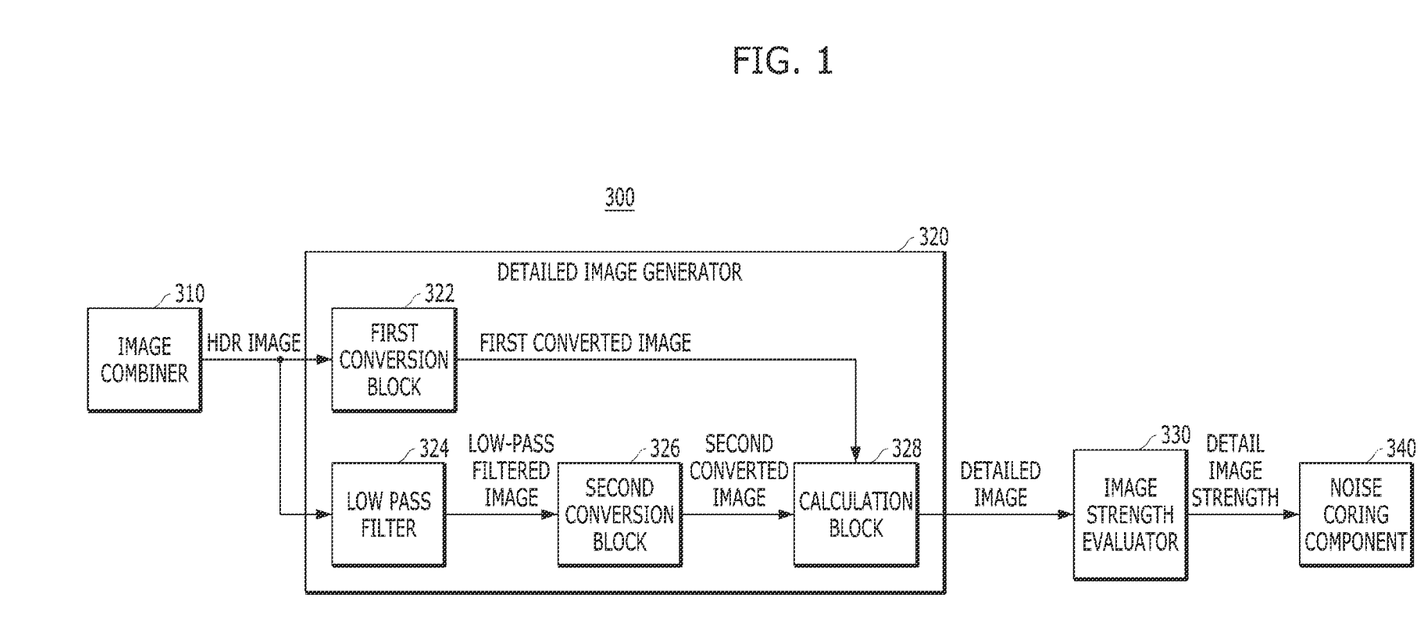
FIG. 1 is a block diagram illustrating a noise removing circuit in accordance with an embodiment of the present invention.
Figure 2:
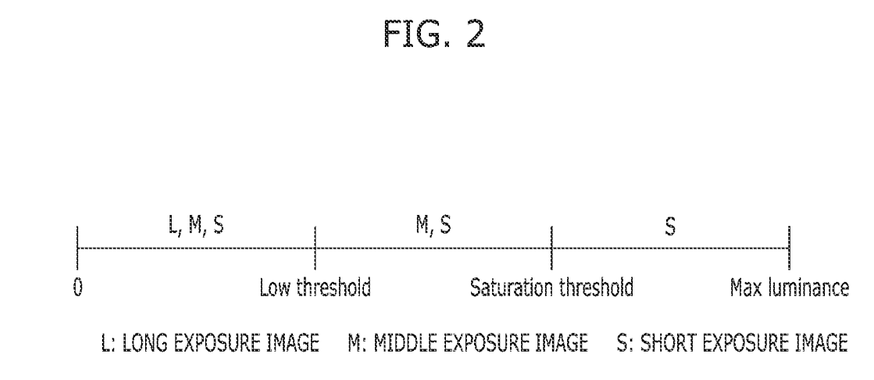
FIG. 2 is a diagram illustrating images that are combined by the image combiner.
Figure 3:
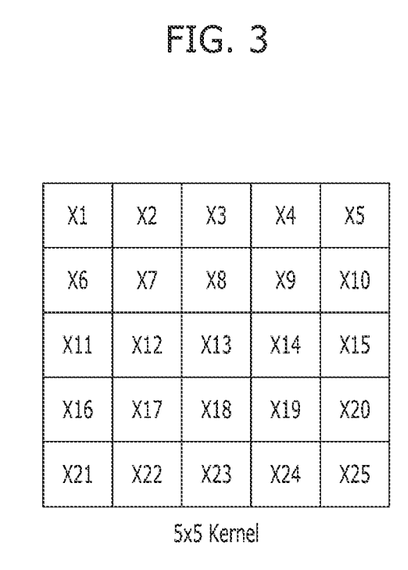
FIG. 3 is a diagram illustrating a 5×5 pixel array.
Figure 4:
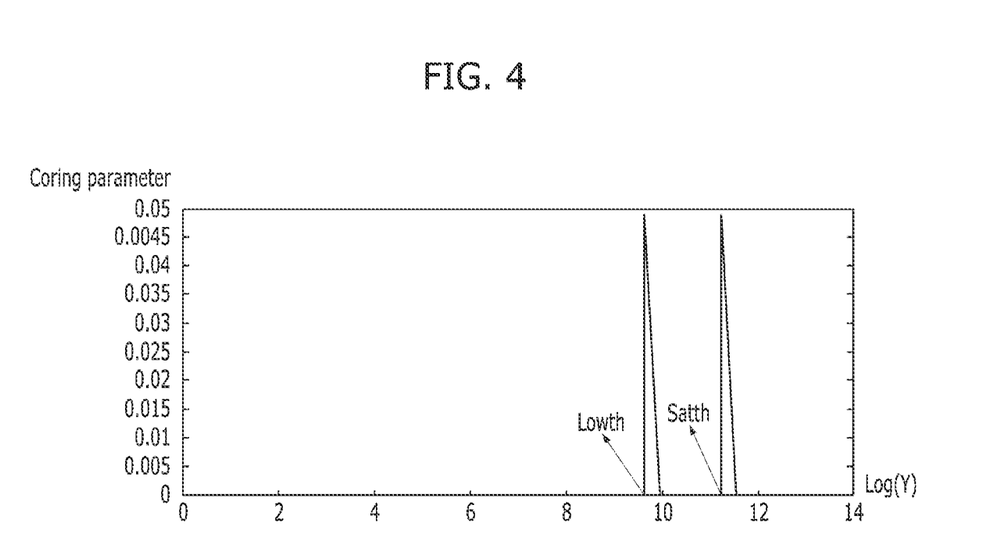
FIG. 4 is a graph illustrating a coring parameter of a noise coring component.
Figure 5:
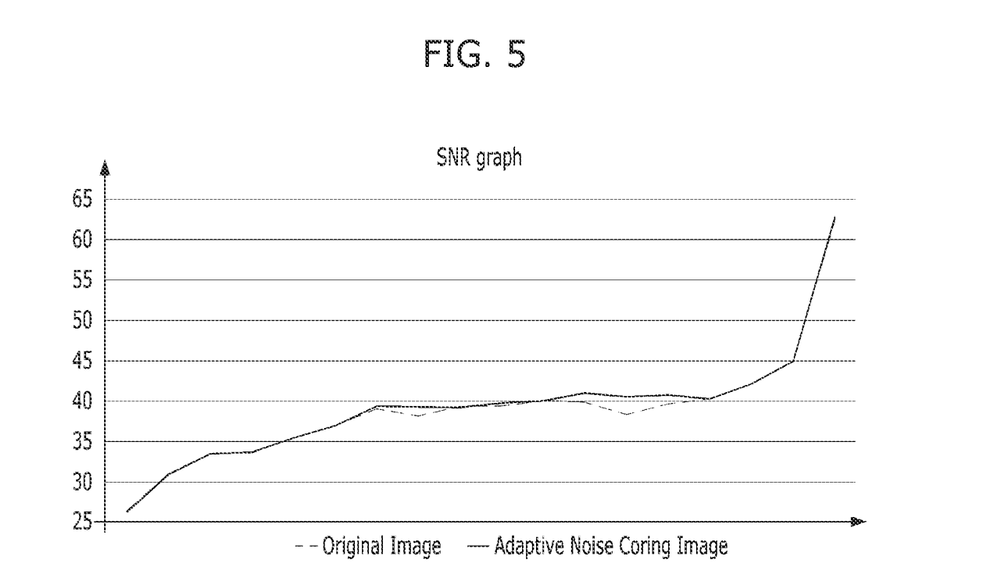
FIG. 5 is a graph illustrating a comparison of an original pixel image and an output image of a noise coring component.

FIG. 1 is a block diagram illustrating a noise removing circuit in accordance with an embodiment of the present invention. FIG. 2 is a diagram illustrating images that are combined by the image combiner. FIG. 3 is a diagram illustrating a 5×5 pixel array. FIG. 4 is a graph illustrating a coring parameter of a noise coring component. FIG. 5 is a graph illustrating a comparison of an original pixel image and an output image of a noise coring component.

Referring to FIG. 1, a noise removing circuit 300 may include an image combiner 310, a detailed image generator 320, an image strength evaluator 330 and a noise coring component 340.

The image combiner 310 may generate a high dynamic range (HDR) image by combining a long exposure image, a middle exposure image and a short exposure image.

Referring to FIG. 2, a low threshold is for determining that the long exposure image has started to become saturated. That is, the low threshold indicates a first region in which the long exposure image and the middle exposure image overlap. A saturation threshold is for determining that the middle exposure image has started to become saturated. That is, the saturation threshold indicates a second region in which the middle exposure image and the short exposure image overlap.

Herein, the low threshold and the saturation threshold may be determined between 600 and 800 of 10 bits image (maximum code value of 1024). That is, the low threshold parameter is determined based on the luminance of the long exposure image, and the saturation threshold parameter is determined based on the luminance of the middle exposure image.

The detailed image generator 320 may generate a detailed image from the HDR image generated from the image combiner 310. The detailed image generator 320 may include a first conversion block 322, a low pass filter 324, a second conversion block 326 and a calculation block 328.

The first conversion block 322 may convert the HDR image to a log domain represented by a first converted image, which is output by the first conversion block 322.

The low pass filter 324 may perform a low pass filtering operation on the HDR image generated by the image combiner 310.

The second conversion block 326 may convert the low-pass-filtered image to the log domain represented by a second converted image, which is output by the second conversion block 326.

The calculation block 328 may generate the detailed image by calculating a difference value between the first converted image outputted from the first conversion block 322 and the second converted image outputted from the second conversion block 326.

The detailed image strength evaluator 330 may evaluate strength of the detailed image generated from the detailed image generator 320.

The strength of the detailed image represents variance of pixel values of the detailed image represented by a pixel array having a set size. Although strength is determined for the detailed image as a whole, strength may vary among different regions of the detailed image. The strength of a region having high variance such as an edge region in the detailed image is relatively large. The strength of a region having low variance such as a flat region in the detailed image is relatively low.

Referring to FIG. 3, in the 5×5 pixel array, the strength value of the detailed image may be set to "0" when the variance of the pixel values of the detailed image is greater than a reference value (threshold), and the strength value of the detailed image may be set to "1" when the variance of the detailed image is less than the reference value as expressed in equation 1. In Equation 1, 'Detail(x)' represents strength of the detailed image, 'Var(Kernel$_{5\times5}$)' represents variance of the detailed image and 'Threshold' represents the reference value.

$$\text{Detail}(x) = \begin{cases} 0, & \text{if Var(Kernel}_{5\times5}) \geq \text{Threshold} \\ 1, & \text{if Var(Kernel}_{5\times5}) < \text{Threshold} \end{cases} \quad \text{[Equation 1]}$$

The noise coring component 340 may perform a noise coring operation for removing noise in a region in which a dip in the signal to noise ratio (SNR) has occurred using the low threshold parameter and the saturation threshold parameter when the strength of the detailed image is less than the reference value, which may be preset. The low threshold parameter indicates the first region which overlaps the long exposure image and the middle exposure image. The saturation threshold parameter indicates the second region which overlaps the middle exposure image and the short exposure image.

Herein, SNR dip indicates that the SNR, which occurs in an overlapped region of images having different exposure times, decreases rapidly when the images having different exposure times are combined. The SNR dip may occur in the overlapped region between the long exposure image and the middle exposure image (i.e., the first region) and in the overlapped region between the middle exposure image and the short exposure image (i.e., the second region).

Also, change may be large in an area of the detailed image with clear details, and change of may be small in an area of the detailed image where detail is blurred.

Since the change of strength in a region of the detailed image where SNR dip occurs is relatively small, the SNR dip noise in each such region may be removed by compressing such region(s). This operation is defined as 'noise coring'.

Referring to FIG. 4, 'Lowth' represents the low threshold that indicates a point on the luminance scale at which an image changes from the long exposure image to the middle exposure image. 'Satth' represents the saturation threshold that indicates a point on the luminance scale at which an image changes from the middle exposure image and the short exposure image.

The noise coring component 340 may adjust the noise coring strength using a coring width parameter in the first region and the second region as expressed in equations 2 and 3.

$$\text{coring strength}_{low}=(\text{Log}(Y)-\text{Log}(\text{Lowth}))/(\text{Log}(\text{Lowth+coring\_width})-\text{Log}(\text{Lowth})) \quad \text{[Equation 2]}$$

$$\text{coring strength}_{sat}=(\text{Log}(Y)-\text{Log}(\text{Lowth}))/(\text{Log}(\text{Lowth+coring\_width})-\text{Log}(\text{Lowth})) \quad \text{[Equation 3]}$$

where 'coring strength$_{low}$' indicates coring strength in the first region around the low threshold, 'coring strenght$_{sat}$' indicates coring strength in the second region around the saturation threshold, 'Log' indicates a log domain conversion function, 'Lowth' indicates the low threshold, 'Satth' indicates the saturation threshold, and 'coring_width' indicates a coring width variance parameter.

Also, the noise coring component 340 may acquire the noise coring parameter using the noise coring strength and an inclination coefficient $\alpha_{coeff}$ as expressed in equation 4. The noise coring component 340 may perform the noise coring operation for removing noise using the noise coring parameter.

$$\text{coring param}=\alpha_{coeff}*\text{Detail}(x)*(1-\text{coring strength}), \text{ if } 0 \leq \text{coring strength} \leq 1 \quad \text{[Equation 4]}$$

where 'Detail(x) represents the strength of the detailed image.

If the strength of the detailed image is greater than the reference value, the noise coring component 340 may be not operated.

Referring to FIG. 5, the noise coring component 340 may improve the SNR in a region in which a dip in SNR occurs by performing the noise coring operation.

Figure 6:
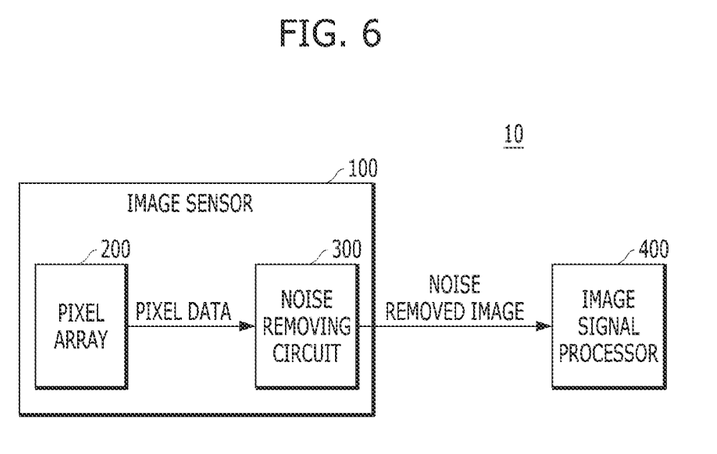
FIG. 6 is a block diagram illustrating an image sensing device employing a noise removing circuit in accordance with another embodiment of the present invention.

FIG. 6 is a block diagram illustrating an image sensing device 10 in accordance with an embodiment of the present invention.

Referring to FIG. 6, the image sensing device 10 may include an image sensor 100 and an image signal processor (ISP) 400.

The image sensing device 10 may be implemented in any suitable electronic device, such as a personal computer (PC) or a mobile computing device that can receive and process image data.

More specifically, the image sensing device 10 may be implemented in a laptop computer, a mobile phone, a smart phone, a tablet, a personal digital assistant (PDA), an enterprise digital assistant (EDA), a digital still camera, a digital video camera, a portable multimedia player (PMP), a mobile internet device (MID), a wearable computer, as an object in an internet of things (IoT) network, or as an object in an internet of everything (IoE) network.

The image sensor 100 may include a pixel array 200 and a noise removing circuit 300.

The pixel array 200 may include a plurality of pixels. Herein, each pixel may represent pixel data, and have an RGB data format, YUV data format, YCbCr data format, or any other data format consistent with the teachings herein.

The noise removing circuit 300 may output a noise-removed image by performing the noise coring operation.

The noise removing circuit 300 may be implemented as shown in FIGS. 1 to 5.

The detailed configuration and operations of the noise removing circuit 300 are described in detail with reference to FIGS. 1 to 5, and thus such description is not repeated here.

The image signal processor 400 may be implemented in an integrated circuit, a system on chip (SoC) or a mobile application processor. The image signal processor 400 may process an output signal of the image sensor 100. That is, the image signal processor 400 may receive and process an image signal outputted from the noise removing circuit 300 of the image sensor 100.

More specifically, the image signal processor 400 may generate RGB image data from a Bayer pattern corresponding to pixel data of the image signal from the noise removing circuit 300. For example, the image signal processor 400 may process a Bayer pattern such that the image data is displayed in a display, and may transfer processed image data to an interface for transfer to another component or device.

In an embodiment, each of the image sensor 100 and the image signal processor 400 may be implemented as a multi-chip package (MCP). In another embodiment, the image sensor 100 and the image signal processor 400 may be implemented as a single chip.

Figure 7:
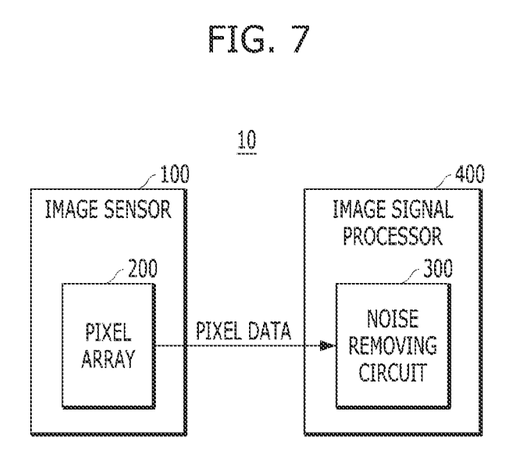
FIG. 7 is a block diagram illustrating an image sensing device employing a noise removing circuit in accordance with another embodiment of the present invention.

FIG. 7 is a block diagram illustrating an image sensing device 10 in accordance with an embodiment of the present invention.

Referring to FIG. 7, the image sensing device 10 may include an image sensor 100 and an image signal processor (ISP) 400. The image signal processor 400 may include a noise removing circuit 300.

The noise removing circuit 300 may be implemented as shown in FIGS. 1 to 5.

The structure and operation of the image sensing device 10 shown in FIG. 7 are substantially the same as the structure and operation of the image sensing device 10 shown in FIG. 6, except that the noise removing circuit 300 is implemented in the image signal processor 400 instead of in the image sensor 100. Thus, detailed description of the image sensing device 10 of FIG. 7 is omitted.

Figure 8:
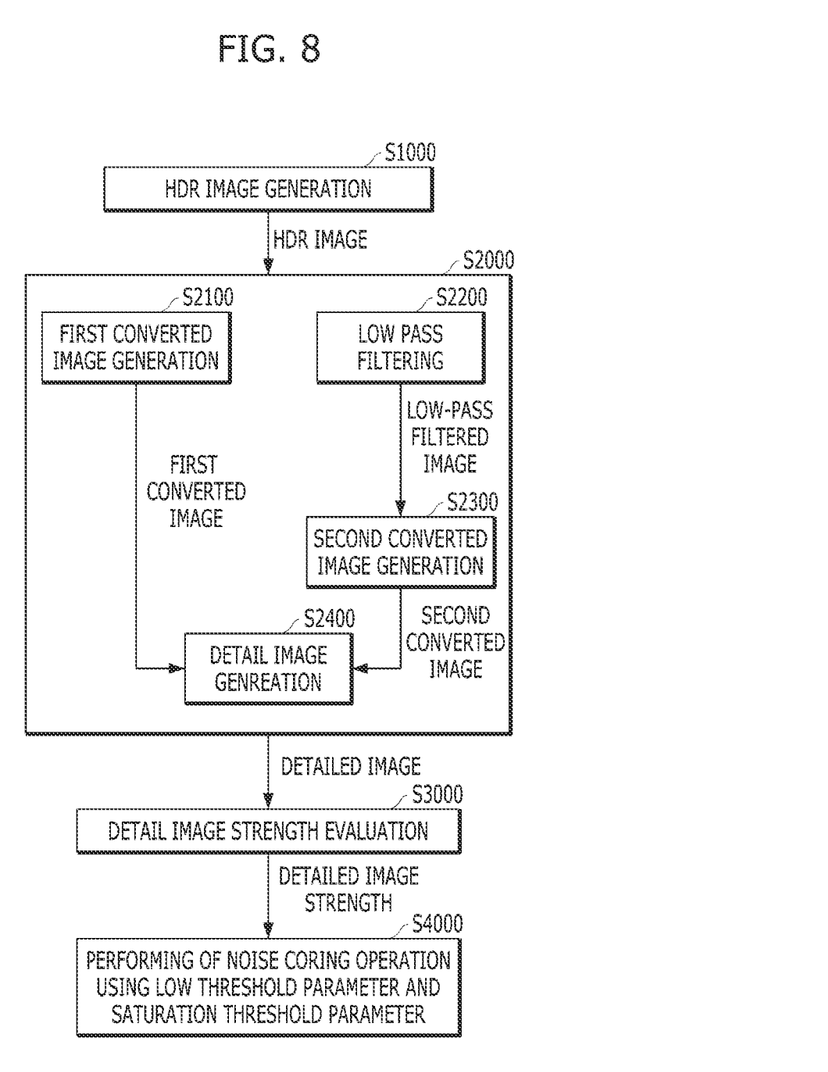
FIG. 8 is a flow chart illustrating an operation of an image sensing device in accordance with another embodiment of the present invention.

Hereinafter, an operation of an image sensing device in accordance with an embodiment of the present invention is described with reference to FIG. 8. FIG. 8 is a flow chart illustrating an operation of an image sensing device (e.g., image sensing device 10 in FIGS. 6 and 7) in accordance with an embodiment of the present invention.

Referring to FIG. 8, the operation of an image sensing device may include an HDR image generation operation S1000, a detailed image evaluation operation S2000, a detailed image strength evaluation operation S3000 and a noise coring operation S4000.

At operation S1000, a HDR image may be generated by combining a long exposure image, a middle exposure image and a short exposure image.

The detailed image evaluation operation S2000 may include a first converted image generation operation S2100, a low pass filter operation S2200, a second converted image generation operation S2300 and a detailed image generation operation S2400.

At operation S2100, a first converted image may be generated by converting the HDR image to a log domain image signal.

At operation S2200, a low-pass filtered image may be generated by low-pass filtering the HDR image through a low pass filter.

At operation S2300, a second converted image may be generated by converting the low-pass filtered image to a log domain image signal.

At operation S2400, the detailed image may be generated by calculating a difference value between the first converted image and the second converted image.

At operation S3000, the strength of the detailed image may be evaluated.

The strength of the detailed image represents variance of pixel values of the detailed image represented by a pixel array having a set size. The strength value of the detailed image is large when the variance of the detailed image is greater than a reference value, and the strength value of the detailed image is small when the variance of the detailed image is less than the reference value.

At operation S4000, if the strength of the detailed image is less than the reference value, the noise coring operation may be performed using the low threshold parameter and the saturation threshold parameter in a region in which a SNR dip occurs. The low threshold parameter indicates a first region which overlaps the long exposure image and the middle exposure image. The saturation threshold parameter indicates the second region which overlaps the middle exposure image and the short exposure image.

Herein, the noise coring strength may be adjusted using the coring width parameter in the first region and the second region. The noise coring operation for removing noise may be performed using the noise coring parameter.

Hereinafter, a system configured to implement an image sensing device in accordance with an embodiment of the present invention is described in detail with reference to FIG. 9.

Figure 9:
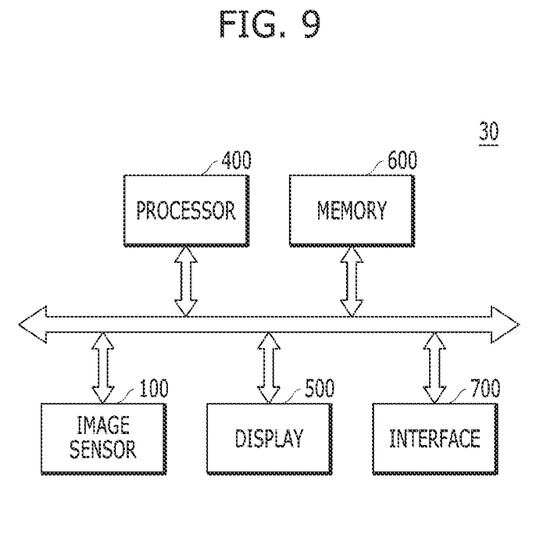
FIG. 9 is a block diagram illustrating a system configured to implement an image sensing device in accordance with another embodiment of the present invention.

FIG. 9 illustrates a system configured to implement an image sensing device in accordance with an embodiment of the present invention.

In various embodiments, the system of FIG. 9 may be any of various types of computing devices, including, but not limited to, a personal computer system, desktop computer, laptop or notebook computer, mainframe computer system, handheld computing device, cellular phone, smartphone, mobile phone, workstation, network computer, a consumer device, application server, storage device, intelligent display, a peripheral device such as a switch, modem, router, etc., or in general any type of computing device.

According to an embodiment, the system 30 of FIG. 9 may include an image sensor 100, a processor 400, a display 500, a memory 600 and an interface 700.

The image sensor 100 and the processor 400 may be configured to implement the image sensor 100 and the image signal processor 400 shown in FIGS. 1 to 8.

The processor 400 may control the image sensor 100. For example, the processor 400 may generate the image data by processing the pixel signal outputted from the image sensor 100.

The memory 600 may store the program for controlling an operation of the image sensor 100 and the image data generated from the processor 400. For example, the memory 600 may be implemented as a non-volatile memory or a volatile memory. The processor 400 may execute the program stored in the memory 600.

The display 500 may display the image data outputted from the processor 400 or the memory 600. The interface 700 may be configured to implement to input or output the image data. The interface 700 may be implemented as a wireless interface and a wire interface.

As described above, a noise removing circuit, an image sensing device and an operation method of the same in accordance with embodiments of the present invention may improve signal-to-noise ratio (SNR) of a region in high dynamic range (HDR) image where a SNR dip occurs, by performing a noise coring on an image of the SNR dip occurrence region using a low threshold parameter and a saturation threshold parameter when images having different exposure time are combined as a single HDR image.

While the present invention illustrates and describes specific embodiments, it will be apparent to those skilled in the art in light of the present invention that various changes and modifications may be made without departing from the spirit and scope of the invention as defined in the following claims. The present invention encompasses all such changes and modifications to the extent they fall within the scope of the claims.

What is claimed is:

1. A noise removing circuit, comprising:
   an image combiner suitable for generating a high dynamic range (HDR) image by combining images having different exposure times;
   a detailed image generator suitable for generating a detailed image from the HDR image;
   an image strength evaluator suitable for evaluating strength of the detailed image; and
   a noise coring component suitable for performing a noise coring operation for removing noise from a region of the detailed image in which a signal to noise ratio (SNR) has decreased using a low threshold and a saturation threshold when the strength of the detailed image is less than a reference value,
   wherein the noise coring component adjusts a noise coring strength using a coring width parameter in a first region in which a long exposure image and a middle exposure image overlap and a second region in which the middle exposure image and a short exposure image overlap.

2. The noise removing circuit of claim 1,
   wherein the images having different exposure times include a long exposure image, a middle exposure image and a short exposure image,
   wherein the low threshold indicates a first region in which the long exposure image and the middle exposure image overlap, and
   wherein the saturation threshold indicates a second region in which the middle exposure image and the short exposure image overlap.

3. The noise removing circuit of claim 1,
   wherein the strength of the detailed image represents variance of pixel values of the detailed image represented by a pixel array having a set size,
   wherein the strength of the detailed image is large when the variance of the detailed image is greater than a reference value, and
   wherein the strength of the detailed image is small when the variance of the detailed image is less than the reference value.

4. The noise removing circuit of claim 1, wherein the noise coring strength is expressed according to the following equation:

$$\text{coring strength}_{low}=(\text{Log}(Y)-\text{Log}(\text{Lowth}))/(\text{Log}(\text{Lowth}+\text{coring\_width})-\text{Log}(\text{Lowth}))$$

$$\text{coring strength}_{sat}=(\text{Log}(Y)-\text{Log}(\text{Satth}))/(\text{Log}(\text{Satth}+\text{coring\_width})-\text{Log}(\text{Satth})),$$

where 'coring strength$_{low}$' represents the coring strength of the first region, 'coring strength$_{sat}$' represents the coring strength of the second region, 'Log' represents a log domain conversion function, 'Lowth' represents the low threshold, 'Satth' represents the saturation threshold and 'coring_width' represents the coring width parameter.

5. The noise removing circuit of claim 1, wherein the noise coring component acquires the noise coring parameter using the noise coring strength and an inclination coefficient.

6. An image sensing device, comprising:
   an image sensor including a pixel array having a plurality of pixels;
   an image signal processor suitable for processing an output signal of the image sensor; and
   a noise removing circuit including:
      an image combiner suitable for generating a high dynamic range (HDR) image by combining images having different exposure times;
      a detailed image generator suitable for generating a detailed image from the HDR image;
      an image strength evaluator suitable for evaluating strength of the detailed image; and
      a noise coring component suitable for performing a noise coring operation for removing a noise from a region of the detailed image in which a signal to noise ratio (SNR) has decreased using a low threshold and a saturation threshold when the strength of the detailed image is less than a reference value,
   wherein the noise coring component adjusts a noise coring strength using a coring width parameter in a first region in which the long exposure image and the middle exposure image overlap and a second region in which the middle exposure image and the short exposure image overlap.

7. The image sensing device of claim 6,
   wherein the images having different exposure times include a long exposure image, a middle exposure image and a short exposure image,
   wherein the low threshold indicates a first region in which the long exposure image and the middle exposure image overlap, and
   wherein the saturation threshold indicates a second region in which the middle exposure image and the short exposure image overlap.

8. The image sensing device of claim 6,
   wherein the strength of the detailed image represents variance of pixel values of the detailed image represented by a pixel array having a set size,
   wherein the strength of the detailed image is large when the variance of the detailed image is greater than a reference value, and
   wherein the strength of the detailed image is small when the variance of the detailed image is less than the reference value.

9. The image sensing device of claim 6, wherein the noise coring strength is expressed according to the following equation:

$$\text{coring strength}_{low} = (\text{Log}(Y) - \text{Log}(\text{Lowth}))/(\text{Log}(\text{Lowth} + \text{coring\_width}) - \text{Log}(\text{Lowth}))$$

$$\text{coring strength}_{sat} = (\text{Log}(Y) - \text{Log}(\text{Satth}))/(\text{Log}(\text{Satth} + \text{coring\_width}) - \text{Log}(\text{Satth})),$$

where 'coring strength$_{low}$' represents the coring strength of the first region, 'coring strength$_{sat}$' represents the coring strength of the second region, 'Log' represents a log domain conversion function, 'Lowth' represents the low threshold, 'Satth' represents the saturation threshold and 'coring_width' represents the coring width parameter.

10. The image sensing device of claim 6, wherein the noise coring component acquires the noise coring parameter using the noise coring strength and an inclination coefficient.

11. An operation method of an image sensing device, comprising:
generating a high dynamic range (HDR) image by combining a long exposure image, a middle exposure image and a short exposure image;
generating a detailed image from the HDR image;
evaluating strength of the detailed image; and
performing a noise coring operation for removing noise from a region of the detailed image in which a signal to noise ratio (SNR) has decreased using a low threshold and a saturation threshold when the strength of the detailed image is less than a reference value,
wherein the low threshold indicates a first region in which the long exposure image and the middle exposure image overlap, and the saturation threshold parameter indicates a second region in which the middle exposure image and the short exposure image overlap, and
wherein performing the noise coring operation includes adjusting a noise coring strength using a coring width parameter in the first region and the second region.

12. The operation method of claim 11,
wherein the strength of the detailed image represents variance of pixel values of the detailed image represented by a pixel array having a set size,
wherein the strength of the detailed image is large when the variance of the detailed image is greater than a reference value, and
wherein the strength of the detailed image is small when the variance of the detailed image is less than the reference value.

13. The operation method of claim 11, wherein the noise coring strength is expressed according to the following equation:

$$\text{coring strength}_{low} = (\text{Log}(Y) - \text{Log}(\text{Lowth}))/(\text{Log}(\text{Lowth} + \text{coring\_width}) - \text{Log}(\text{Lowth}))$$

$$\text{coring strength}_{sat} = (\text{Log}(Y) - \text{Log}(\text{Satth}))/(\text{Log}(\text{Satth} + \text{coring\_width}) - \text{Log}(\text{Satth})),$$

where 'coring strength$_{low}$' represents the coring strength of the first region, 'coring strength$_{sat}$' represents the coring strength of the second region, 'Log' represents a log domain conversion function, 'Lowth' represents the low threshold, 'Satth' represents the saturation threshold and 'coring_width' represents the coring width parameter.

14. The operation method of claim 11, wherein performing the noise coring operation further includes acquiring the noise coring parameter using the noise coring strength and an inclination coefficient.

* * * * *